United States Patent
Eiland et al.

(10) Patent No.: US 8,312,542 B2
(45) Date of Patent: Nov. 13, 2012

(54) NETWORK INTRUSION DETECTION USING MDL COMPRESS FOR DEEP PACKET INSPECTION

(75) Inventors: Edward E. Eiland, Niskayuna, NY (US); Scott C. Evans, Burnt Hills, NY (US); Jeremy D. Impson, Vestal, NY (US); Thomas S. Markham, Niskayuna, NY (US); Eric Steinbrecher, Windsor, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 952 days.

(21) Appl. No.: 12/260,682

(22) Filed: Oct. 29, 2008

(65) Prior Publication Data

US 2010/0107254 A1 Apr. 29, 2010

(51) Int. Cl.
*G06F 9/00* (2006.01)
*G06F 11/00* (2006.01)

(52) U.S. Cl. ............... 726/23; 726/13; 726/22; 726/24

(58) Field of Classification Search ............ 726/11–14, 726/22–25; 713/188; 709/223–225, 227–229; 370/229–235, 238; 706/12–14
See application file for complete search history.

(56) References Cited

U.S. PATENT DOCUMENTS

| | | | |
|---|---|---|---|
| 5,903,676 A | 5/1999 | Wu et al. | |
| 5,956,676 A | 9/1999 | Shinoda | |
| 6,189,005 B1 | 2/2001 | Chakrabarti et al. | |
| 6,601,048 B1 | 7/2003 | Gavan et al. | |
| 6,782,377 B2 | 8/2004 | Agarwal et al. | |
| 7,007,035 B2 | 2/2006 | Kamath et al. | |
| 7,089,592 B2 | 8/2006 | Adjaoute | |
| 7,134,141 B2 | 11/2006 | Crosbie et al. | |
| 7,254,273 B2 | 8/2007 | Sakanashi et al. | |
| 7,313,817 B2 | 12/2007 | Evans et al. | |
| 7,409,716 B2 | 8/2008 | Barnett et al. | |
| 7,503,070 B1 * | 3/2009 | Alstyne et al. | 726/22 |
| 7,584,507 B1 * | 9/2009 | Nucci | 726/23 |
| 7,620,985 B1 * | 11/2009 | Bush et al. | 726/22 |
| 7,712,134 B1 * | 5/2010 | Nucci et al. | 726/23 |
| 8,015,133 B1 * | 9/2011 | Wu et al. | 706/21 |
| 2003/0033435 A1 * | 2/2003 | Hanner | 709/247 |
| 2003/0074573 A1 * | 4/2003 | Hursey et al. | 713/200 |
| 2004/0157556 A1 * | 8/2004 | Barnett et al. | 455/41.2 |

(Continued)

FOREIGN PATENT DOCUMENTS

WO WO 2005/055073 A1 6/2005

OTHER PUBLICATIONS

Adriaans, Pieter. "Learning as Data Compression," 2007, CiE '07 Proceedings of the 3rd conference on Computability in Europe: Computation and Logic in the Real World, Springer-Verlag Berlin, Heidelberg, pp. 11-24.*

(Continued)

*Primary Examiner* — Darren B Schwartz
(74) *Attorney, Agent, or Firm* — Ronald E. Prass, Jr.; Prass LLP

(57) ABSTRACT

A network intrusion detection system and method that includes a grammar inference engine. A grammar-based Minimum Description Length (MDL) compression algorithm is used to determine an attack based on closeness of fit to one or more compression models. The network intrusion detection system and method can determine zero day attacks.

26 Claims, 9 Drawing Sheets

U.S. PATENT DOCUMENTS

| | | | |
|---|---|---|---|
| 2004/0250128 | A1 | 12/2004 | Bush et al. |
| 2004/0257988 | A1* | 12/2004 | Evans et al. .................. 370/230 |
| 2005/0273274 | A1 | 12/2005 | Evans et al. |
| 2006/0026678 | A1* | 2/2006 | Zakas ............................. 726/22 |
| 2007/0087756 | A1 | 4/2007 | Hoffberg |
| 2007/0192863 | A1* | 8/2007 | Kapoor et al. .................. 726/23 |
| 2007/0233735 | A1* | 10/2007 | Han et al. .................. 707/104.1 |
| 2007/0240222 | A1* | 10/2007 | Tuvell et al. .................... 726/24 |
| 2008/0016314 | A1 | 1/2008 | Li et al. |

OTHER PUBLICATIONS

Spracklin, L.M. "Filtering Spam Using Kolmogorov Complexity Estimates," May 21-23, 2007, IEEE, 21$^{st}$ International Conference on Advanced Information Networking and Applications Workshops (AINAW'07), pp. 321-328.*

Evans, Scott et al. "MDLcompress for Intrusion Detection: Signature Inference and Masquerade Attack," Oct. 29-31, 2007, IEEE, Military Communications Conference, 2007 (MILCOM 2007), pp. 1-7.*

Eiland, E., et al. "Network Intrusion Detection: Using MDLcompress for Deep Packet Inspection," MILCOM2008, Nov. 16-19, 2008.*

Proceedings of the Fourth IEEE, Computer Science, "An Application of Information Theory to Intrusion Detection", E. Earl Eiland and Lorie M. Liebrock, Ph.D. Apr. 2006.

Proceedings of 2003 International, "Masquerade Detection Using Enriched Command Lines", Roy A. Maxion, Aug. 2003.

IEEE Transactions on Pattern Analysis and Machine Intelligence, vol. 21, No. 2 dated Feb. 1999, entitled, "Using Evolutionary Programming and Minimum Description Length Principle for Data Mining of Bayesian Networks", pp. 174-178.

Proceedings of the 28$^{th}$ Hawaii International Conference on System Sciences, 1995 IEEE, "Molecular Evolutionary Phylogenetic Trees Based on Minimum Description Length Principle", Fengrong Ren et al., pp. 165-173.

Axellson S., "The Base-Rate Fallacy and the Difficulty of Intrusion Detection", Transactions on Information and System Security, 2000, 3:3, pp. 186-205.

A. Liu, C. Martin, T. Hetherington and S. Matzner, "A Comparison of System Call Feature Representations for Insider Threat Detection", Proceedings of the 2005 IEEE Workshop on Information Assurance and Security United States Military Academy, West Point, NY.

R.A. Maxion and T.N. Townsend, "Masquerade Detection using Truncated Command Lines", In International Conference on Dependable Systems and Networks (DSN-02), pp. 219-228, Los Alamitos, CA, Jun. 23-26, 2002, IEEE Computer Society Press, Washington, D.C.

R.A. Maxion and T.N. Townsend, "Masquerade Detection Augmented with Error Analysis". IEEE Transactions on Reliability, 53(1): 124-147, Mar. 2004.

M. Schonlau, W. DuMouchel, W. Ju, A. Karr, M. Theus, Y. Vardi, (2001), "Computer Intrusion: Detecting Masquerades", Statistical Science, 2001;16(1):58-74.

R.A. Maxion, "Masquerade Detection Using Enriched Command Lines". In International Conference on Dependable Systems and Networks (DSN-03), pp. 5-14, Los Alamitos, CA Jun. 22-25, 2003. IEEE Computer Society Press. San Francisco, CA.

E.E. Eiland, and Lorie M. Liebrock, "An Application of Information Theory to Intrusion Detection", Proceedings of the 4$^{th}$ IEEE International Workshop on Information Assurance, Royal Holloway, UK, Apr. 2006.

S.C. Evans, B. Barnett, G.J. Saulnier and S.F. Bush, "Minimum Description Length Principles for Detection and Classification of FTP Exploits," Milcom 2004.

S.F. Bush and S.C. Evans, "Information Assurance Design and Assessment: Final Report", General Electric Research and Development Center, Aug. 2002.

S. Goel and Stephen F. Busch, Kolmogorov Complexity Estimates for Detection of Viruses in Biologically Inspired Security Systems: A Comparison with Traditional Approaches., Complexity, 9:2, pp. 54-73, 2003.

Benedetto, Caglioli and Loreto, "Language Trees and Zipping", Physical Review Letters, 88, 2002. Grunwald, et al. Advances in Minimum Description Length Theory and Applications. MIT Press, 2005.

C. de la Higuera, "A Bibliographical Study of Grammatical Inference", Pattern Recognition vol. 38, pp. 1332-1348, 2005.

S. C. Evans, G.J. Saulnier and S.F. Bush, "A New Universal Two Part Code for Estimation of String Kolomogorov Complexity and Algorithmic Minimum Sufficient Statistic," DIMACS Workshop on Complexity and Inference, 2003, http://www.stat.ucla.edu/-cocteau/dimacs/evans.pdf.

S.C. Evans, T.S. Markham, A. Torres, A. Kourtidis and D. Conlin, "An Improved Minimum Description length Learning Algorithm for Nucleotide Sequence Analysis," Proceedings of IEEE 40$^{th}$ Asilomar Conference on Signals, Systems and Computers, Pacific Grove, CA, Nov. 2006.

S.C. Evans, A. Kourtidis, T.S. Markham, J. Miller, D. Conklin and A. Torres, "MicroRNA Target Detection and Analysis for Genes Related to Breast Cancer Using MDLcompress," EURASIP Jounal on Bioinformatics and Ssystems Biology, Special Issue on Information Theoretic Methods for Bioinformatics, Sep. 2007.

M. Latendresse, "Masquerade Detection via Customized Grammars", Lecture Notes in Computer Science, 3548: 141-159, Jun. 2005.

C.G. Nevill-Manning and I.H. Witten (1997), "Identifying Hierarchical Structure in Sequences in a Linear Time Algorithm," Journal of Artificial Intelligence Research, 7, 67-82.

C.G. Nevill-Manning and I.H. Witten, I.H.; "Compression and Explanation Using Hierarchical Grammars"; http://sequitur.info/, Dept of Computer Science, University of Waikato, Hamilton, New Zealand, May 22, 2007.

P. Gacs, J.T. Tromp and P. Vitanyi, "Algorithmic Statistics", IEEE Transactions on Information Theory, vol. 47, No. 6, Sep. 2001, pp. 2443-2463.

T.M. Cover and J.A. Thomas, Elements of Information Theory, Wiley, NY 1991.

M. Li and P. Vitanyi, "An Introduction to Kolmogorov Complexity and its Applications", Spring, NY 1997.

R. Richardson, CSI Survey 2007: The 12$^{th}$ Annual Computer Crime and Security Survey. 2007, Computer Security Institute: San Francisco, CA.

2007 Threat Report, 2008 Threat and Tech. Forecast. 2008, Trend Micro, Inc.: Tokyo, Japan.

T. AbuHmed, A. Mohaisen and D. Nyang, "A Survey on Deep Packet Inspection for Intrusion Detection Systems"; Mar. 2008.

I. Zhang and G.B. White, "An Approach to Detect Executable Content for Anomaly Based Network Intrusion Detection", in 21$^{st}$ Internat.1 Parallel and Distributed Processing Symp. 2007, IEEE. P. 424.

M.Z. Shafiq et al., Extended Thymus Action for Improving Response of AIS based NID System Against Malicious Traffic, in Congress on Evolutionary Computation, 2007. 2007, IEEE. P.3369-3376.

J.M. Estevez-Tapiador, P. Garcia-Teodoro and J.E. Diaz-Verdejo, Measuring Normality in HTTP Traffic for Anomaly-based Intrusion Detection. Computer Networks, 2004. 45(2):p. 18.

K.L. Ingham and A. Somayaji, A Methodology for Designing Accurate Anomaly Detection Systems, in Latin America Networking Conference, 2007, San Jose, CA ACM.

S. Evans et al., Minimum description length principles for detection and classification of FTP exploits, in Military Communications Conference, 2004, MILCOM 2004, IEEE. 2004.

P.D. Grunwald, "The Minimum Description Length Principle". 2007, Cambridge, MA: MIT Press. 703.

P. Adriaans and P. Vitanyi, The Power and perils of MDL. In IAIT 2207.2007.Nice, France.

G. Munz, S. Li and G. Carle, "Traffic Anomaly Detection Using k-means Clustering", in Leistungs, Zuverlässigkeitsund Verlässlichkeitsbewertung Kommunikationsnetzen und Verteilten Systemen, 4. Gl/itg-Wks. MMBne. 2007. Hamburg, Germany.

K. Wang and S.J. Stolfo, "Anomalous Payload-based Network Intrusion Detection, Recent Advances in Intrusion Detection SpringerLink", Editor. 2004, Springer:Berlin/Heidelberg, Germany. pp. 203-222.

N. Athanasiades et al. "Intrusion Detection Testing and Benchmarking Methodologies", in Proceedings of the First IEEE International Workshop on Info. Assurance. 2003, Los Alamitos, CA, IEEE.

Staff. MIT Lincoln Laboratory Information Systems Technology [Web site] 2008 [cited May 21, 2008]; Umbrella site for 1999 DARPA Intrusion Detection Evaluation Data Set]. Available from: http://www.II.mit.edu/mission/communications/ist/corpora/ideval/data/1999data.html.

Staff. Tenable Network Security. [Web page] 2008 [cited May 21, 2008]; Home page for Nessus Vulnerability Tppl]. http://www.nessus.org/essus/.

J. Elson, tcpflow—TCP Flowrecorder. [Web page] Aug. 7, 2003 [cited May 22, 2008]; Available from: http://www.circlemud.org/~jelson/software/tcpflow/.

S. Wehner, Analyzing Worms and Network Traffic Using Compression, in arXiv:cs/0504045v1 [cs.CR] Apr. 12, 2005.

R. Duda, P.E. Hart and D.G. Stork, Pattern Classification ($2^{nd}$ Edition) John Wiley and Sons, 2001.

GE Research & Lockheed Martin Corporation; "MDLcompress for Intrusion Detection: Signature Inference and Masquerade Attack" Jun. 2007 IEEE.

* cited by examiner

NETWORK INTRUSION DETECTION USING MDL COMPRESS FOR DEEP PACKET INSPECTION

This application is directed to an invention(s) that was made as a result of activities undertaken within the scope of a Joint Research Agreement made between Lockheed Martin Corporation and the General Electric Company.

Embodiments of the present invention relate generally to methods and systems for intrusion detection and, more specifically, to methods and systems for network intrusion detection using minimum description length inferred grammars associated with data sets in an information system.

The increasing interconnectedness of communications systems is driving an increasing challenge for providing information assurance, such as, for example, providing access to data and services to legitimate users while prohibiting or blocking unauthorized use. Breaches in communications or data security can be costly. For example, a 2007 survey by the Computer Security Institute (CSI) Computer Crime and Security reported a per-incident cost of malicious activity at US$345K, more than double the reported per-incident cost in 2006. Other surveys have observed that the web-based attack rate has increased more than fifteen fold since 2005. One of the causes for these marked increases is the ineffectiveness of known intrusion detection systems to address increasing attack release rates, such that many modern malicious activities can escape detection. For military applications, not only can there be financial exposure, but also the risk of physical harm as well.

Network-based intrusion detection systems (NIDS) rely on a wide range of network measures. Low overhead, low granularity measures such as traffic rate and mean packet size can assess overall system stress level, but may be too general for intrusion detection. Higher accuracy in intrusion detection can be achieved by using higher granularity, such as, for example, inspecting individual information packets. However, some malicious traffic, such as Trojans and viruses, SQL injection and HTTP buffer overflows function at the application layer (OSI layer 7). These attacks can function by injecting executable code into a target machine. Thus, such attacks can have headers or header portions of packets that are indistinguishable from normal traffic. In such cases, only deep packet inspection (DPI), or payload analysis, may be effective for providing intrusion detection.

In addition, once an attack is discovered and identified, in many cases a unique signature can be identified for that attack. Because the signatures for known attacks can be disseminated, it is possible that only a few known attacks may avoid detection. However, previously unknown (commonly known as "zero-day") attacks can often remain undiscovered until other observable events or symptoms such as, for example, a network slowdown or a rash of computer crashes, bring the attack to light.

Thus, there is a need for a network intrusion detection system and method that can, among other things, provide deep packet inspection and address zero-day attacks.

DETAILED DESCRIPTION

Embodiments relate generally to an intrusion detection system and method. In particular, a network intrusion detection system and method that includes a grammar inference engine. A grammar-based Minimum Description Length (MDL) compression algorithm is used to determine an attack based on closeness of fit to one or more compression models.

Figure 1:
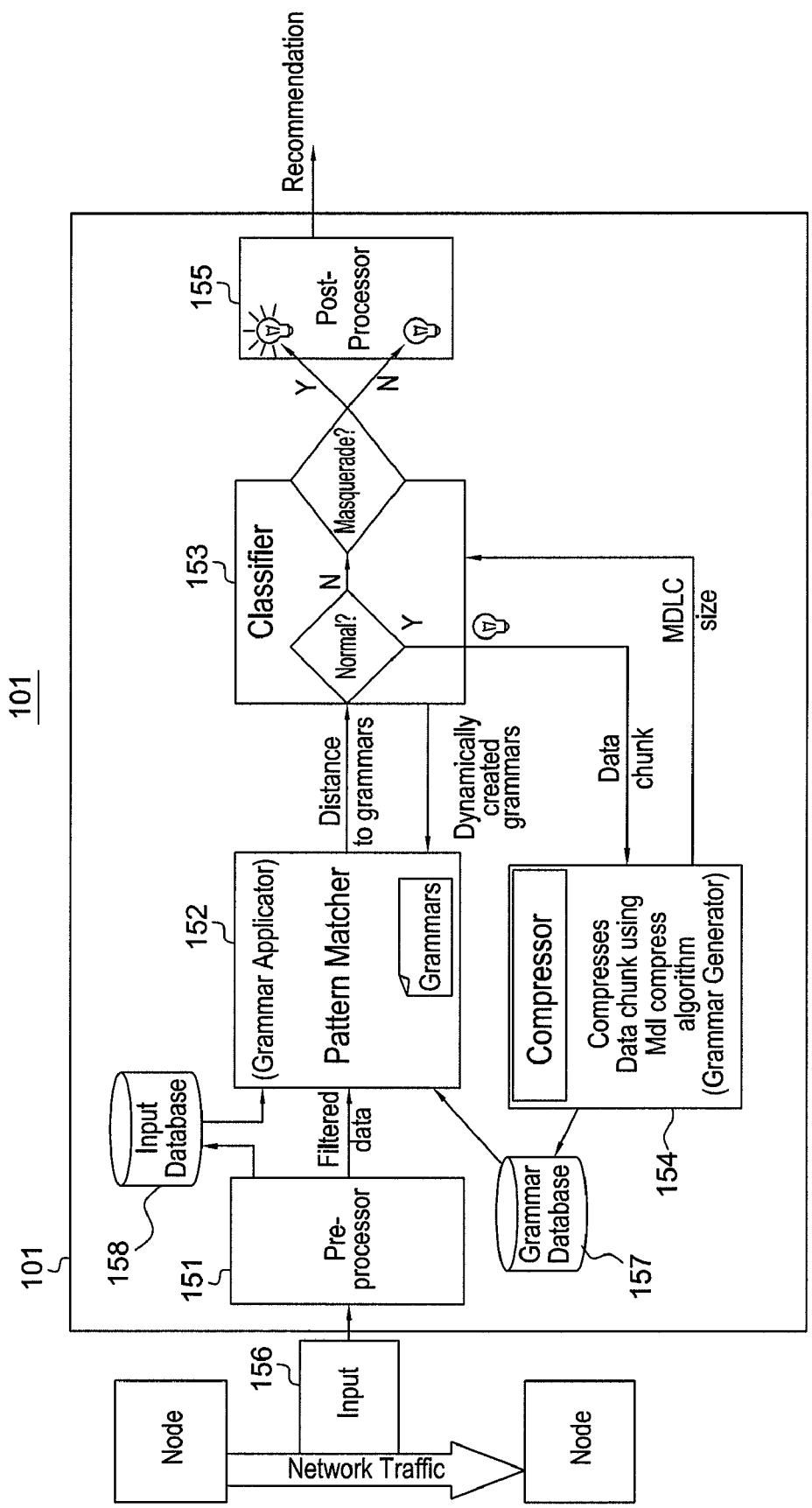
FIG. 1 is a network intrusion detection system according to various embodiments.

With respect to FIG. 1, there is shown a network intrusion detection system 100 according to various embodiments. As shown in FIG. 1, according to various embodiments the network intrusion detection system 100 can comprise a grammar inference engine 101 configured for intrusion detection and including a pre-processor 151 coupled to a grammar applicator (pattern matcher) 152, a classifier 153 coupled to the grammar generator 152, and to a grammar generator or compressor 154. According to various embodiments, the pre-processor 151 can be configured to receive an input data stream 156, and be configured to output filtered data to the grammar applicator 152. The grammar applicator 152 can be configured to apply grammars produced using a compression algorithm to the filtered or processed input data received from the pre-processor 151. The grammar generator 154 can be coupled to the classifier 153 and configured to generate grammars using the compression algorithm. In various embodiments, the grammar applicator 152 and grammar generator 154 can perform the same compression algorithm. Furthermore, in various embodiments, the grammar applicator 154 can calculate compression data by applying a grammar-based compression algorithm to a portion of the input data 156 associated with a particular user, as described herein. In addition, in various embodiments, the grammar applicator 154 can calculate a distance value based on a closeness of fit of discrete sequential portions of the input data stream 156 with one or more class models.

In various embodiments, the classifier 153 can be coupled to the grammar applicator 152, the grammar generator 154, and to a post-processor 155. The classifier 153 can compare grammars generated or identified by the grammar applicator 152 to the input data stream 156. In particular, the classifier 153 can be configured to determine a likelihood of fit between each portion of the input data stream 156 and the class models based on the distance calculation results provided by the grammar applicator 152. For example, the classifier 153 can be configured to determine to which of a number of learned compression models the input data, as processed or filtered by the pre-processor 151, is closest. In this regard, the classifier 153 can receive distance values from the grammar applicator 152 and decision criteria from the post-processor 155. Furthermore, the classifier 153 can send a grammar generation request to the grammar generator 154 and, optionally, can send dynamically generated grammars to the grammar applicator 152. Furthermore, the post-processor 155 may assign each of the sequential portions of the input data stream 156 to one of the class models. The post-processor 155 can also be configured to output a recommendation as to whether the input data stream 156 has been classified as an attack, thus detecting an attack on the network, or if normal behavior is determined, e.g., a healthy session. Further, the post-processor 155 can also output an indication of the assigned class model. In various embodiments, the classifier 155 in evaluating a particular input data stream can also take into consideration relevant information from one or more other input data streams.

For example, according to various embodiments, if input data is relatively "far" from all known normal and attack models, based on an expected information distance, then a potential zero day attack can be determined and a caution indication may be output. Alternatively, a zero day attack indication can be output upon the determination of a zero day attack, or simply an attack indication can be output. A compression model for the detected behavior may by calculated and stored for later use and/or reference and for further analysis. As used herein, a "zero day attack" can refer to an attack which is being observed in the first instance and has not previously been determined to constitute a learned attack model.

In various embodiments, multiple different types of attack models can be supported. For example, models can be provided for attacks associated with buffer overflow, JavaScript™, user-to-root, and scan traffic types of activities.

According to various embodiments, the grammar inference engine can further include a grammar database 157 operatively coupled to the grammar applicator 152 and the grammar generator 154. The grammar database 157 can include compression models such as, for example, health signature models and fault signature models formed using compressed data sets from application of a compression algorithm. The health signature models can include models associated with known healthy or normal session activity or behavior, and the fault signature models can include models associated with known attacks or other malicious or unauthorized activities. In various embodiments, the grammar applicator 152 can be configured to apply one or more of the compression models to the processed or filtered input data received from the pre-processor 151.

The grammar inference engine 101 can also include an input database 158 operatively coupled to the output of the pre-processor 151 and the input of the grammar applicator 152. In various embodiments, the input database 158 can store input data that is processed or filtered by the pre-processor 151. The grammar applicator 152 can then retrieve or obtain the filtered input data from the input database 158 independently of the data rate of the input data stream 156.

The pre-processor 151 can also be configured to apply a sliding window protocol to the input data stream that segments or divides the input data stream into discrete or separate portions of sequential information. Input data streams of various lengths can be supported such as, for example, input data streams of at least 1 KB in length. In various embodiments, the pre-processor 151 can filter the input data stream 156 by removing from consideration input data known to not be useful for harboring or supporting network attacks such as, for example, but not limited to, timestamp data.

According to various embodiments, the pre-processor 151 can also remove or filter packet payload components that could introduce ambiguities. Such unwanted components can be discarded or replaced with a discrete or binary value more amenable to classification. For example, various embodiments can include a Deterministic Finite Automata (DFA) model to eliminate "noise" inducing packet payloads from the input data stream 156. An example of such a DFA model is described in Ingham, K. L. and A. Somayaji, "A Methodology for Designing Accurate Anomaly Detection Systems," Latin America Networking Conference, 2007, San Jose, Calif.: ACM, which is hereby incorporated by reference. For example, in various embodiments, complex strings that have no intrusion detection information can be replaced with strings of X's or another no-operation code.

Furthermore, according to various embodiments, the pre-processor 151 can concatenate the input data stream payloads in receipt order, for input data that is not received sequentially or that is retrieved from a data store. In addition, the strings or requests monitored can be unidirectional to provide finer granularity. For example, monitored input data can include only client requests, only server responses, or both. Because the grammar generator 154 and grammar applicator 152 can each produce the same output (for example, compressed strings), both may also require input data to be pre-processed in the same way.

In various embodiments, the input data stream can be received from an information system. For example, the information system can be a communication network such as, for example, an intranet or the Internet. In such embodiments, the input data stream can comprise packetized digital information such as, for example, digital information provided in accordance with the Transport Control Protocol/Internet Protocol (TCP/IP), the HyperText Transport Protocol (HTTP), the Simple Mail Transport Protocol (SMTP), or the Uniform Datagram Protocol (UDP). However, the network intrusion detection system 100 can be used for intrusion detection by intercepting or monitoring an information path between any two or more nodes of any communication system or, further, between any two or more nodes of a network or a distributed computing system, according to any protocol which could be used for malicious activity. In such embodiments, the input data stream 156 can be a sequential data stream.

In various embodiments, requests from client to server can be monitored for intrusion detection. Examples of such monitored requests include, for example, but not limited to, HTTP request payloads. Monitoring of requests can be advantageous because an external HTTP-based attack must start with a query, and so detecting malicious activity in queries can provide early detection. Furthermore, server responses include a wide variety of data types, making normal HTTP server responses difficult to model. In addition, client requests are more easily classified than server responses.

In various embodiments, the grammar inference engine 101 can use a compression algorithm for classification of input data. For example, according to various embodiments, the grammar applicator 152 and grammar generator 154 can be configured to perform a Minimum Description Length (MDL) Compression (MDLC) algorithm to generate grammars. As used herein, the term "grammars" refers to a set of rules and relationships that are associated with particular data sequences. Furthermore, the term "model" or "compression model" as used herein refers to a set of one or more grammars with a probability distribution being associated with each grammar. For example, the grammar applicator 152 can take the MDLC-identified grammars and apply them to an unclassified input stream, and then calculate the unknown data's distance from the known data classes, as represented by their models. The distance values can then be passed on to the classifier 153.

In various embodiments, the grammar inference algorithm can use Minimum Description Length (MDL) principles taken from the theory of Kolmogorov Complexity and Algorithmic Information Theory to infer a grammar, finding patterns and motifs that aid most in compressing unknown data sets. In particular, the grammar inference engine can use such an algorithm to infer grammars and then apply those grammars to identify masquerades or other difficult to detect intrusion attacks. In addition, in various embodiments, the grammar inference engine 101 can be configured to detect anomalous, hostile, or attack events in linear time. Further information regarding MDL principles is provided in Grunwald, P. D., "The minimum description length principle," 2007, Cambridge, Mass., MIT Press. 703, and Adriaans, P. and P. Vitanyi, "The Power and Perils of MDL," in IAIT 2007, Nice, France, both of which are hereby incorporated by reference. An example of K means clustering is provided in Munz, G., S. Li, and G. Carle, "Traffic anomaly detection using k-means clustering," Leistungs-, Zuverlässigkeitsund Verlässlichkeitsbewertung von Kommunikationsnetzen und Verteilten Systemen, 4 GI/ITG-Wks. MMBne, 2007, Hamburg, Germany.

According to various embodiments, the MDLC algorithm can be utilized to form an estimate of the Randomness Deficiency (RDS) of a data sample, D, consisting of d elements with respect to model M of m elements, defined as:

$$\delta(D \mid M, d) \stackrel{\pm}{=} \log\binom{m}{d} - K(D \mid M, d), . \quad \text{Eq. 1}$$

where $D \subset M$, and $J$ otherwise, and $K(D|M,d)$ is the Kolmogorov Complexity of data set D given M and d. Randomness deficiency estimates the degree that data sample D is atypical to the model M.

The MDLC algorithm can allow for the estimation of these values as follows:

$$K(D|M,d)=GA(D|M), \quad \text{Eq. 2}$$

Where GA is the Grammar Applicator 152 that applies a previously learned MDLC model M on the data set D.

The data can be fit to model code, or the log of the estimated number or elements, in the typical set of which D is a proposed typical member, by:

$$\log\binom{m}{d} \approx MDLC(T)\frac{d_D}{d_T}, . \quad \text{Eq. 3}$$

which normalizes the log(size) of the typical set in a linear fashion based on the number of elements in the data sample, as compared to the compressed size and number of elements in the training set.

Furthermore, a linear normalization applied to the training data is obtained by applying the following:

$$\delta(D \mid M, d) = \left| MDLC(T)\frac{d_D}{d_T} - GA(D \mid M) \right|. \quad \text{Eq. 4}$$

Figure 2:
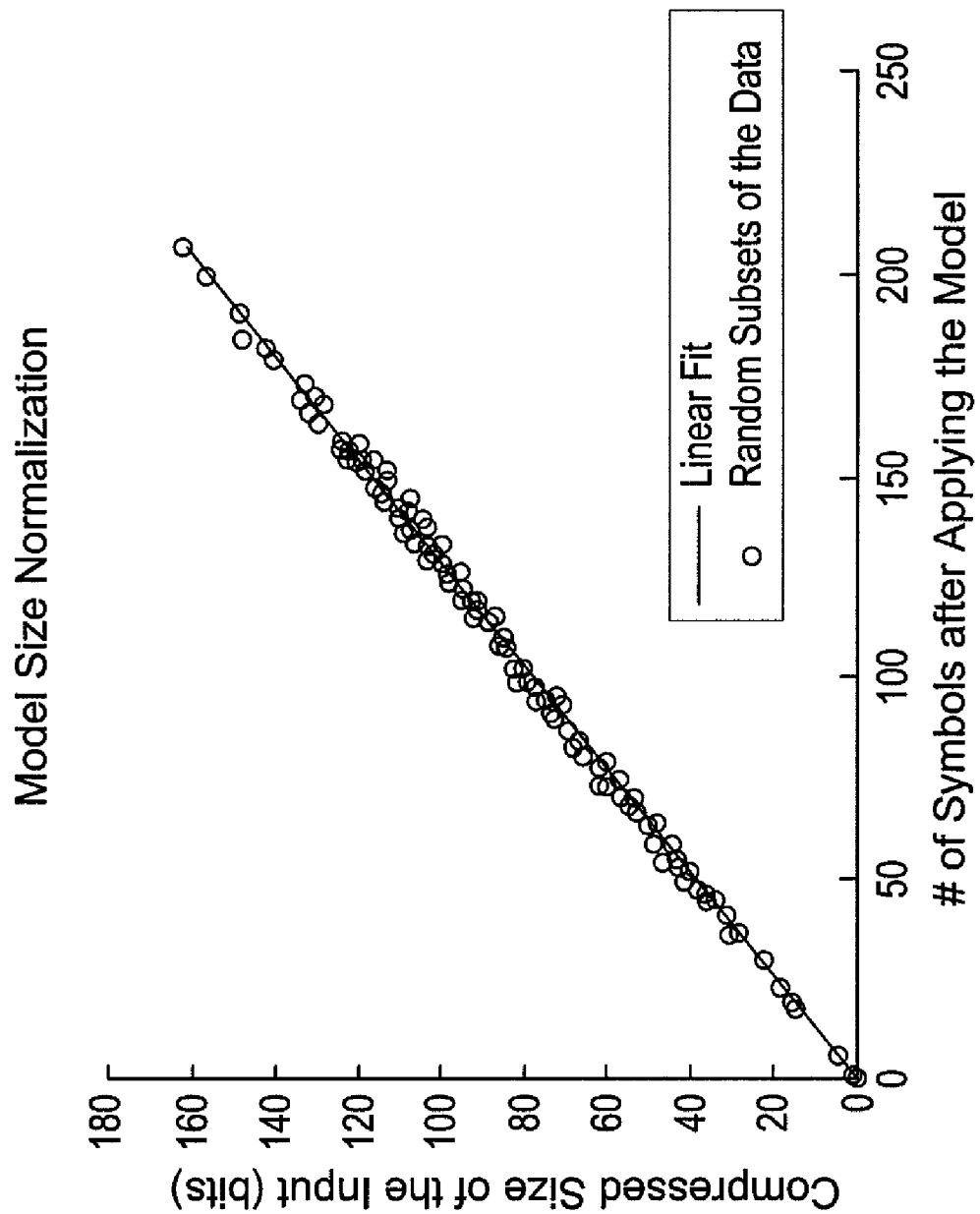
FIG. 2 illustrates a model size normalization relationship for a compressed size of input data based on a number of symbols after application of a compression method to obtain an estimate of randomness deficiency, according to various embodiments.

With regard to FIG. 2, there is shown a model size normalization relationship for the compressed size of the input based on the number of symbols after application of the MDL Compress method to obtain an estimate of RDS. Referring to FIG. 2, it can be seen that application of the MDL Compress compression algorithm to random subsets of training data provides a very linear characteristic of compressed file size versus the number of elements in the training data, d. Thus, various embodiments can include estimating RDS by applying the MDL Compress compression algorithm models to compress a data set, and comparing the result to an expected compression based on compression of similarly-sized training data.

In various embodiments, the grammar inference engine 101 can perform intrusion detection and, in particular, detection of zero day attacks, by evaluating data samples of the input data as follows. First, it is determined to which of a set of normal models and to which of a set of attack models the input sample is closest, where:

$$\delta_{Normal}(D \mid M, d) = \min_j \{\delta_j(D \mid M_j^{Normal}, d)\}. \quad \text{Eq. 5}$$

is the normal model estimate of randomness deficiency, and:

$$\delta_{Attack}(D \mid M, d) = \min_i \{\delta_i(D \mid M_i^{attack}, d)\}. \quad \text{Eq. 6}$$

is the attack model estimate of randomness deficiency.

Next, these determined randomness deficiencies can be screened to see if they are within a certain threshold. For example, a threshold could be selected of three standard deviations of both the attack and normal models. If a data sample is not determined to be close to either the attack or the normal models, then it can be flagged as a potential zero day attack. Input data samples that are within the threshold distance from either attack or normal models can be compared by forming a difference as follows:

$$\Delta\hat{\delta}(D|M,d)=\hat{\delta}_{Normal}(D|M,d)-\hat{\delta}_{Attack}(D|M,d) \quad \text{Eq. 7}$$

In various embodiments, a positive value for $\Delta\delta\hat{0}(D|M,d)$ according to Eq. 7 above can indicate classification as an attack, while a negative value can indicate a normal or healthy session. Furthermore, the more positive or negative the value, the stronger the confidence in the determination. In addition, values within some threshold from zero are candidates for evaluation as zero day attacks. In various embodiments, the compression algorithm can be executed with a speed n·log(n), where n is the number of compressed data sets.

Figure 3:
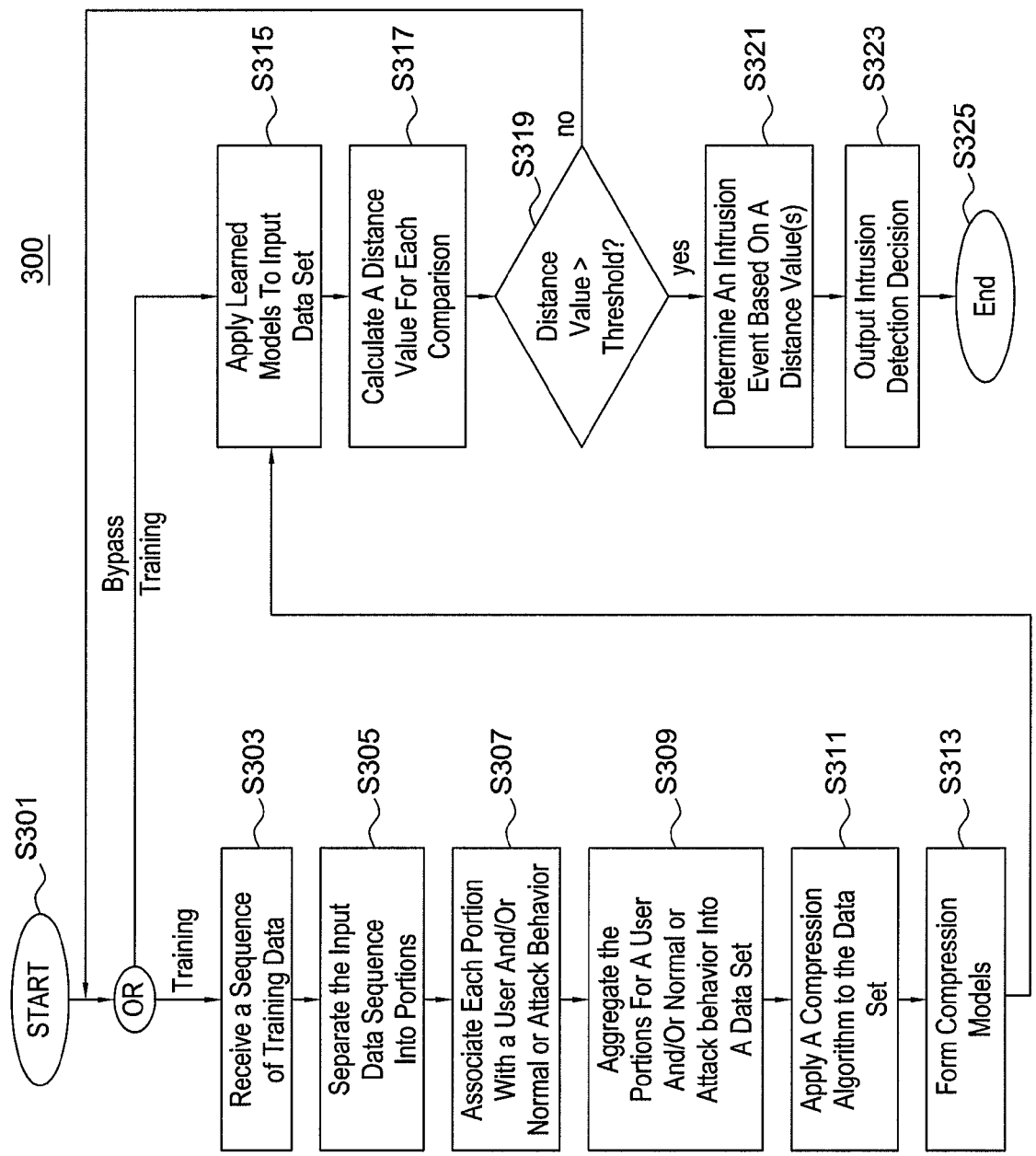
FIG. 3 is a flow chart illustrating a intrusion detection method according to various embodiments.

With regard to FIG. 3, there is shown a network intrusion detection method 300 according to various embodiments. Referring to FIG. 3, a network intrusion detection method 300 can commence at S301. If training or building of user grammars and/or models is to be performed, control can proceed to S303. If training or building of user grammars is not to be performed, then the method 300 can proceed to S315 to begin performing network intrusion detection. At S303, the method 300 can include receiving a sequence of training data. In at least one embodiment, selection of the training data to be tested can be received from an operator via a human-machine interface. The method can then proceed to S305 to separate the input data sequence into portions for processing. The method can then proceed to S307 at which the method can associate each portion with a user and/or normal or attack behavior. The method can then proceed to S309 to aggregate the portions for a user and/or normal or attack behavior into a data set. The method can then proceed to S311 to apply a compression algorithm to user data to build user grammars. The compression algorithm can be, for example, the MDL compression algorithm as described herein. The method can then proceed to S313 to form grammar models based on the results of the compression algorithm in S311. The method can then proceed to S315 to apply learned models to an input data set. The method can then proceed to S317 to calculate a distance value for each comparison. The method can then proceed to S319 where, if the calculated distance value exceeds a threshold, the method can proceed to S321. Otherwise, the method can return to S301.

At S321, the method can determine an intrusion event based on the distance value. According to various embodiments, for a zero day attack, S321 can further include updating the compression models to include the newly-determined attack model associated with the zero day attack. This can be accomplished upon receiving an instruction from a user or operator of the system 100 using a human-machine interface. Alternatively, the compression models can be automatically updated by, for example, the classifier 153, to include the newly-determined attack model associated with the zero day attack. The method can then proceed to S323, at the method can include outputting an indication of a network intrusion, following which the method can end at S325.

According to various embodiments, the steps S315 through S325 can be repeated as required for continued network intrusion detection. Furthermore, steps S303 through S313 can be repeated to build additional user grammars and/or models. However, in various embodiments, the step steps S303 through S313 can be optional. That is, the method 300 can perform network intrusion detection without training or using pre-built grammars/models. Furthermore, in at least one embodiment, once a compression model has been built as described above with respect to FIG. 3, the network intrusion detection method according to various embodiments can be consequently re-applied to input data sets and executed with a speed n·log(n), where n is the number of compressed data sets. Therefore, embodiments can perform network intrusion detection in real-time.

The inventors have found that embodiments of the present invention have low error rates compared to existing systems and methods. Table 1 below shows a distribution of HTTP client queries of an input data stream tested by the inventors.

TABLE 1

HTTP Client Queries For Various Traffic Types

| NORMAL | SCAN | USER-2 ROOT | JAVASCRIPT | BUFFER OVERFLOW |
|---|---|---|---|---|
| 4268 | 883 | 35 | 21 | 6 |

According to various embodiments, RDS can be used can be used as a distance measure. For example, the model to which the input data has the lowest RDS can determine the classification of the input data. Alternatively, compressibility can be used as the distance measure.

Figure 4:
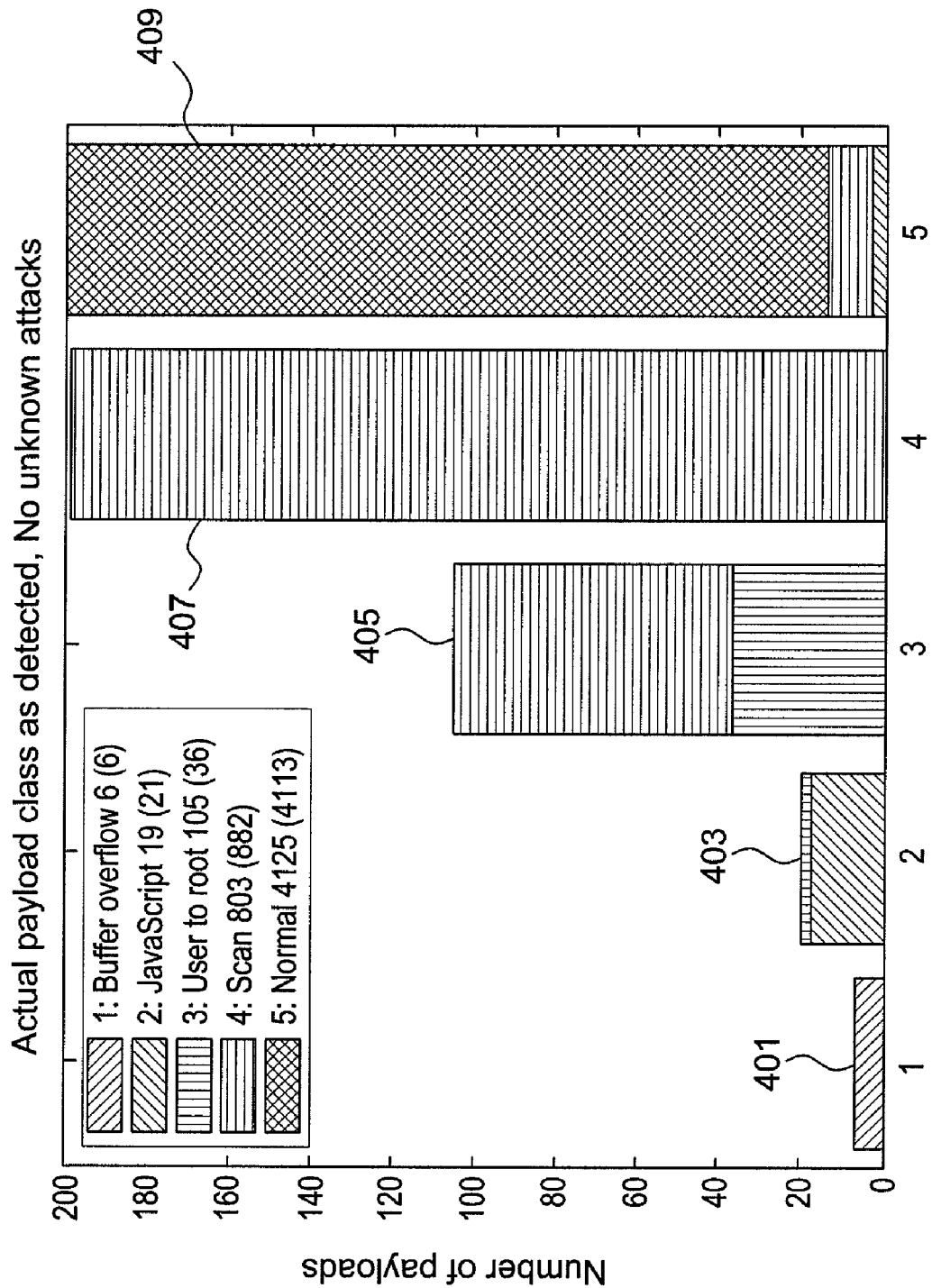
FIG. 4 is shown a bar chart illustrating classification of payloads of a sample data set according to four attack models and one normal model, where all attacks are known, in various embodiments.
Figure 5:
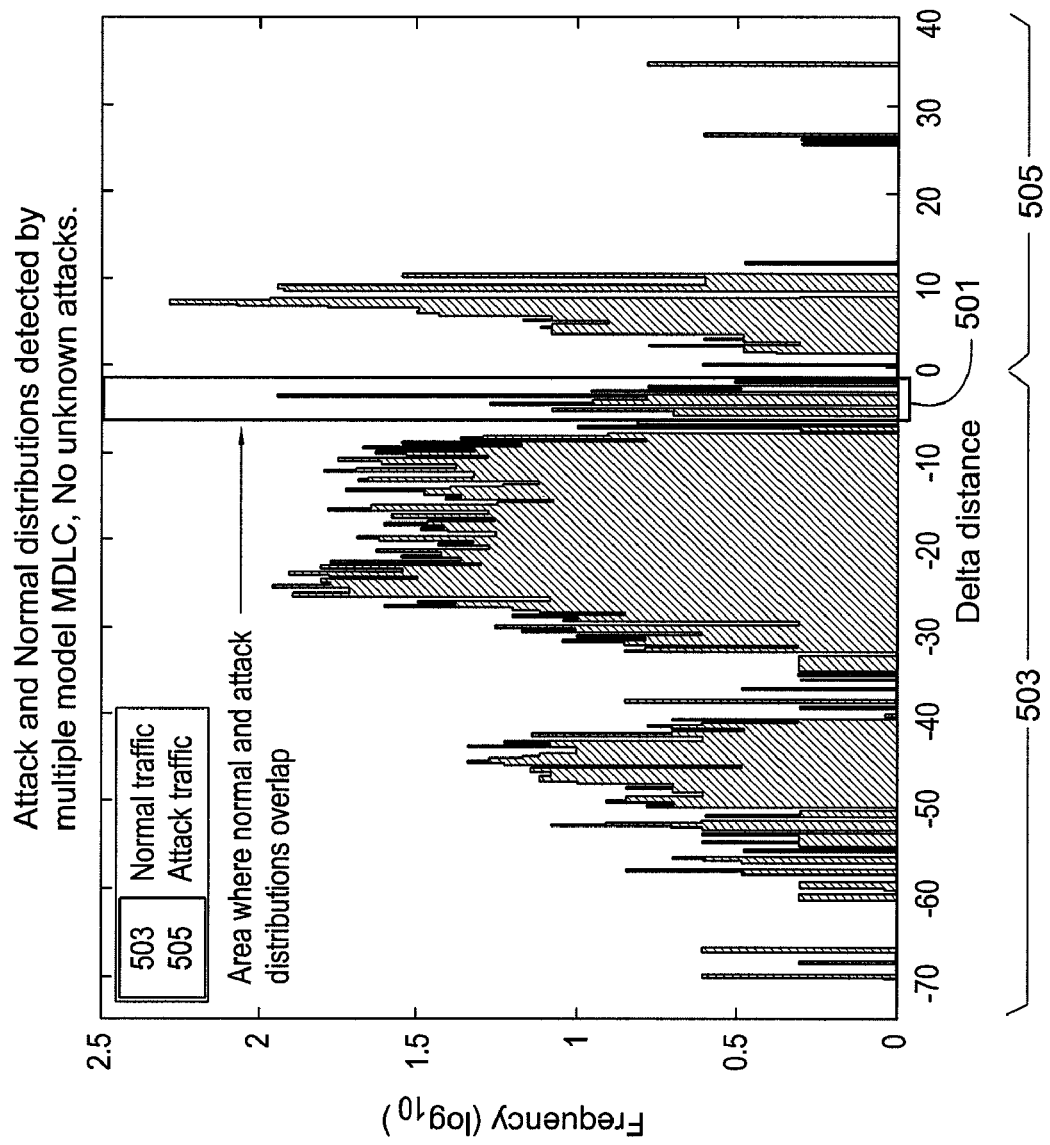
FIG. 5 is a histogram chart illustrating classification of payloads of a sample data set according to four attack models and one normal model, where all attacks are known, in various embodiments.

If $\Delta\hat{\delta}(D|M,d)$ quantifies the difference between the RDS of the data sample given the normal model and that given the best matching attack model. The closer these two values are, the less confident the classification decision. If RDS is an effective intrusion detection metric, then mis-classified payloads may only occur when $\Delta\hat{\delta}(D|M,d)$ is low. With respect to FIGS. 4 and 5, there is shown a bar chart and a histogram chart, respectively, indicating classification of payloads of a sample data set according to four attack models and one normal model, with none of the attacks being an unknown attack. Referring to FIG. 4, five classifications are shown: buffer overflow 401, JavaScript 403, User to root 405, Scan 407, and Normal 409. In the results shown in the histogram of FIG. 5, only one false positive classification (false alarms) is shown, and thirteen false negatives (missed attacks) are shown for the sample data set. Only JavaScript and Scan attacks were not detected. The histogram shows that these mis-classifications were weakly classified, as shown at the mis-classification area 501, where the distributions overlap. The normal distribution's shape can be tri-modal.

Figure 6:
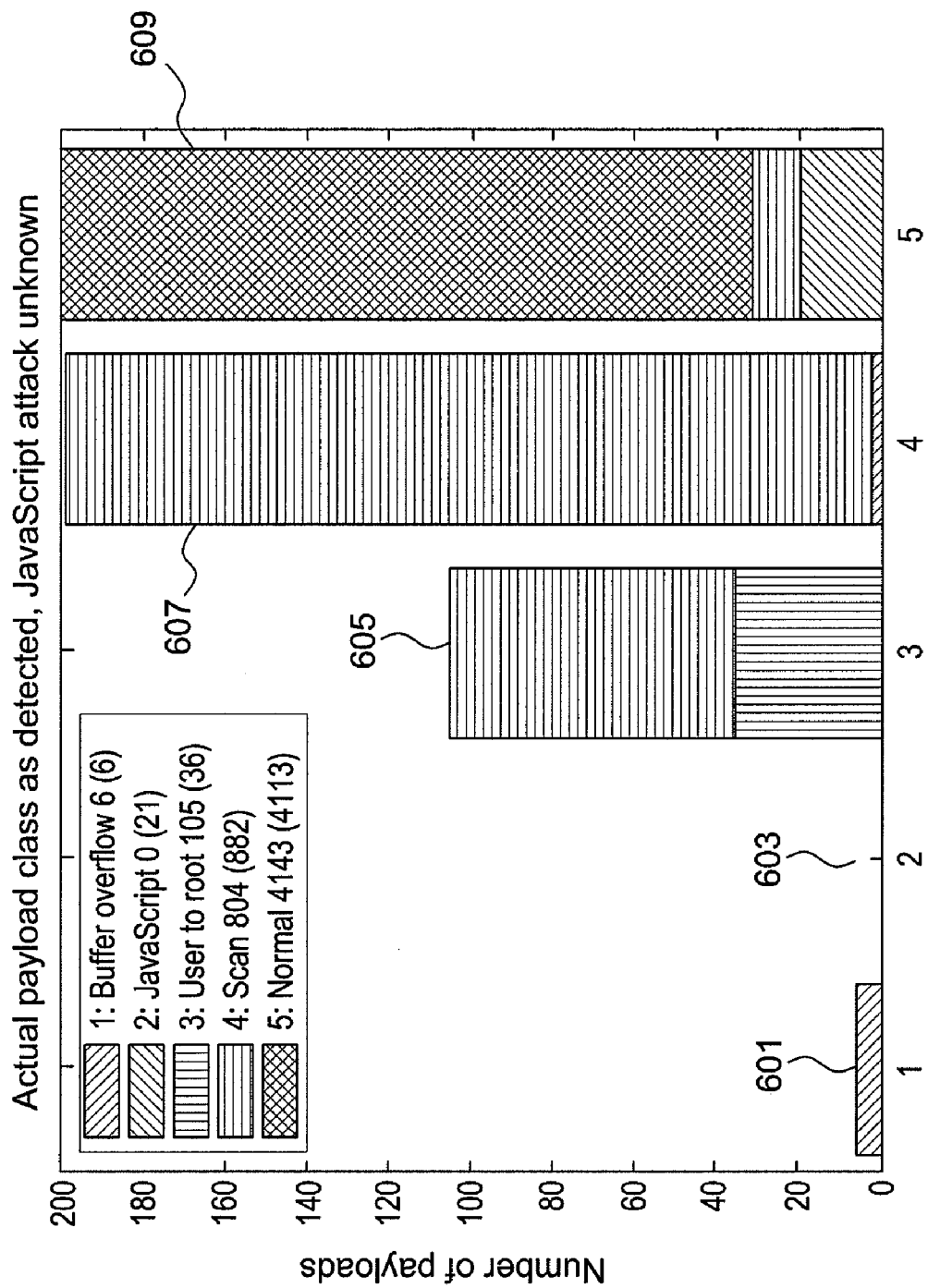
FIG. 6 is shown a bar chart illustrating classification of payloads of a sample data set according to four attack models and one normal model, where one attack is unknown, in various embodiments.
Figure 7:
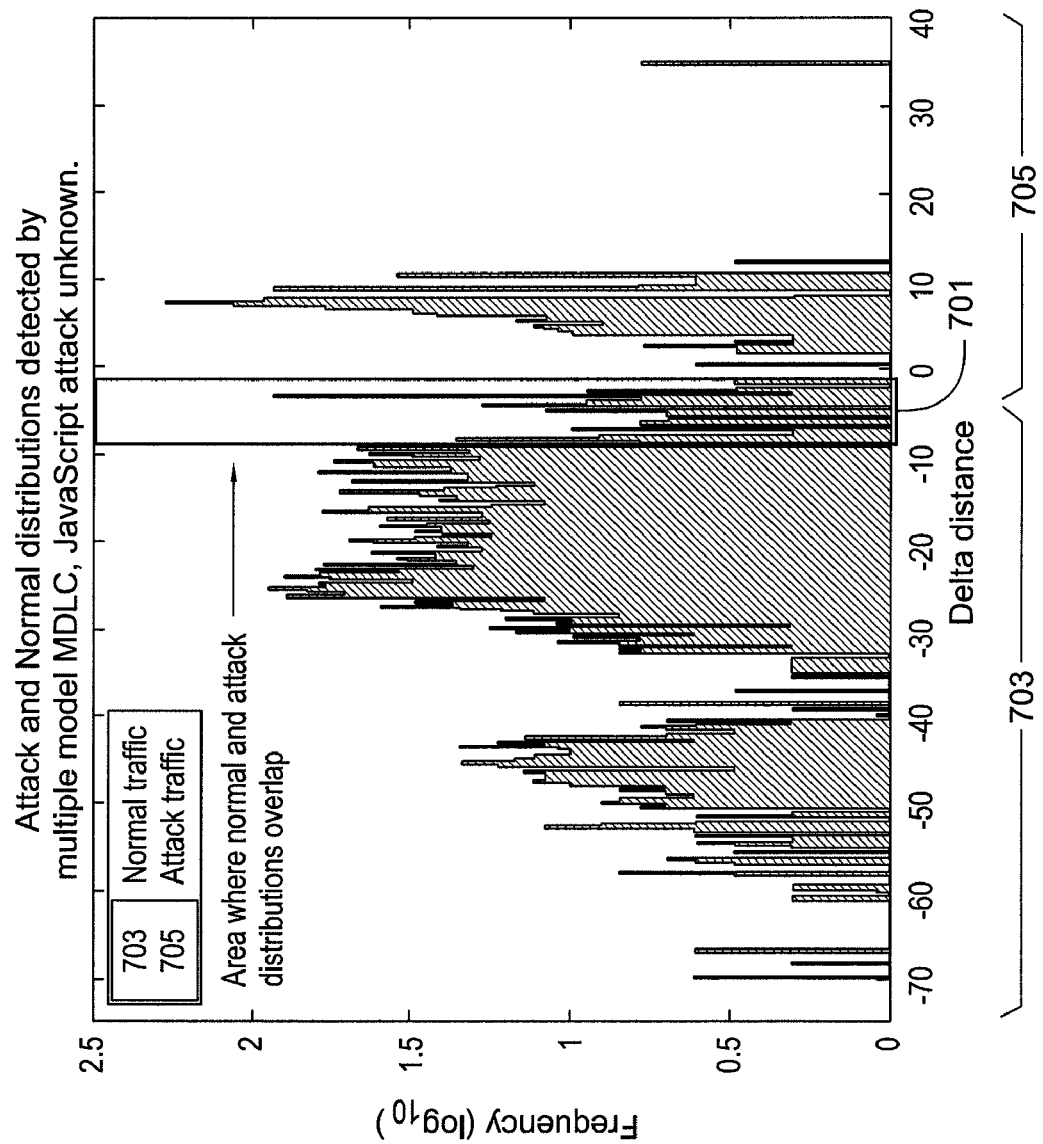
FIG. 7 is a histogram chart illustrating classification of payloads of a sample data set according to four attack models and one normal model, where one attack is unknown, in various embodiments.

Furthermore, with respect to FIGS. 6 and 7, there is shown a bar chart and a histogram chart, respectively, indicating classification of payloads of a sample data set according to a JavaScript attack taken as an unknown attack (for example, a zero day attack). Referring to FIG. 6, five classifications are shown: buffer overflow 601, JavaScript 603, User to root 605, Scan 607, and Normal 609. In the results shown in the histogram of FIG. 7, it is seen that all JavaScript attacks were mis-classified as normal. In the histogram of FIG. 7, the mis-classifications occur in the interval 701 where the attack and normal distributions overlap. Comparing the results to those for no un-modeled attacks in FIGS. 4 and 5, it is shown that the errors fall in a low confidence zone and, as with FIG. 5, they fall within the mode where the normal model is weakest. However, the system 100 and method according to various embodiments had an overall error rate of 10.6%, which accuracy is better than known methods.

Figure 8:
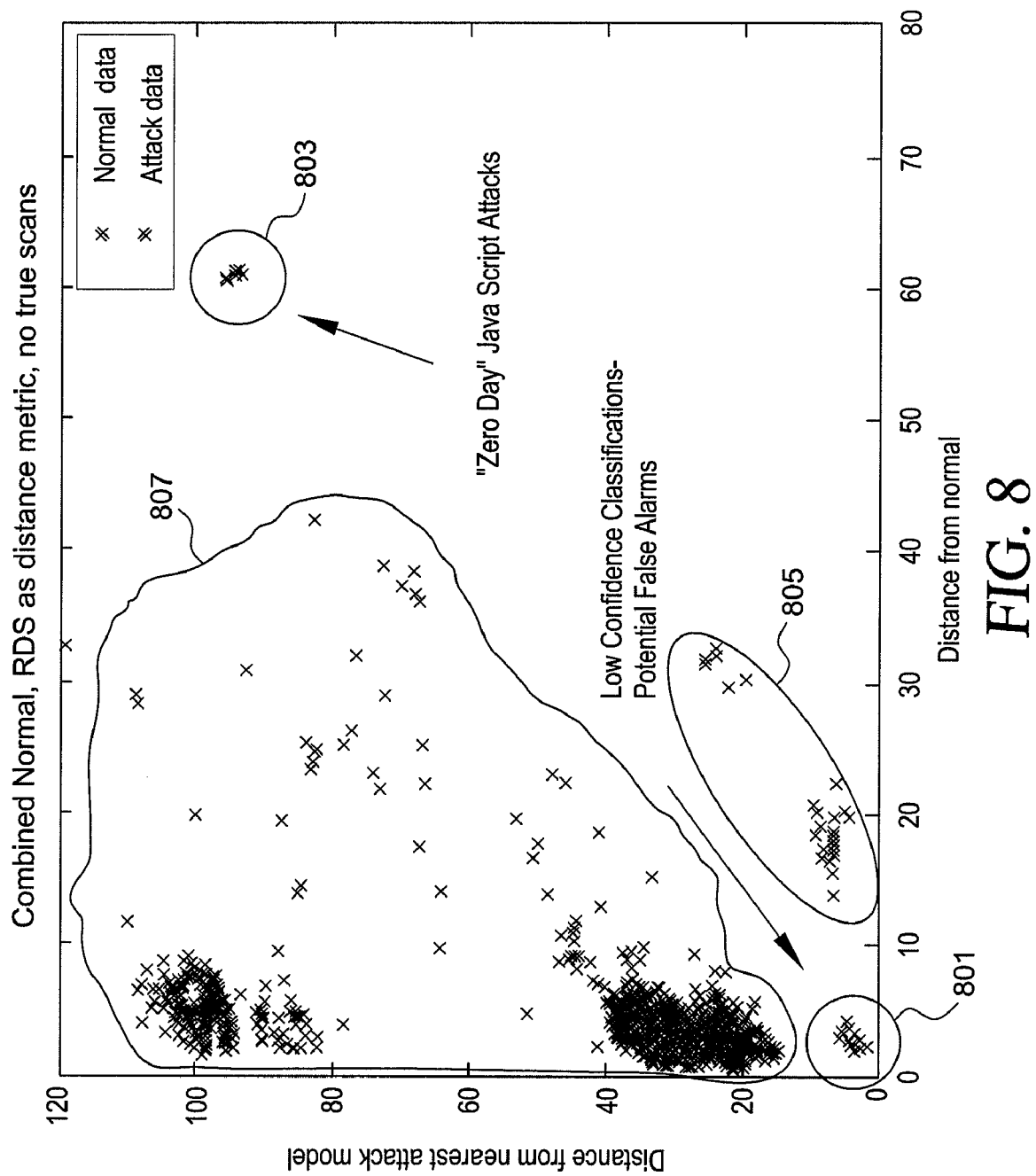
FIG. 8 is a chart showing a receiving operating characteristic curves in accordance with various embodiments.

With respect to FIG. 8, there is shown an example output display 800 illustrating classification to one or more compression models, according to various embodiments. In various embodiments, according to various embodiments, the output intrusion detection decision can be an indication such as, for example, an alarm output provided to a user via a display (such as, for example, output display 800), illumination of a Light Emitting Diode (LED), hardcopy printout, transmission of an alarm or alerting message to a communications device, computing device, or telecommunications terminal, or other audible or visual alarms.

For example, FIG. 8 and Table 2 illustrate detection accuracy for each scenario. The ROC curve for Scan as an unknown can be substantially lower than the rest. As can be seen in FIG. 8, classifications with lower confidence levels 801 can have a higher potential false alarm rate. Furthermore, zero-day attacks 803 can have relatively higher distance from both normal models 807 and attack models 805.

Figure 9:
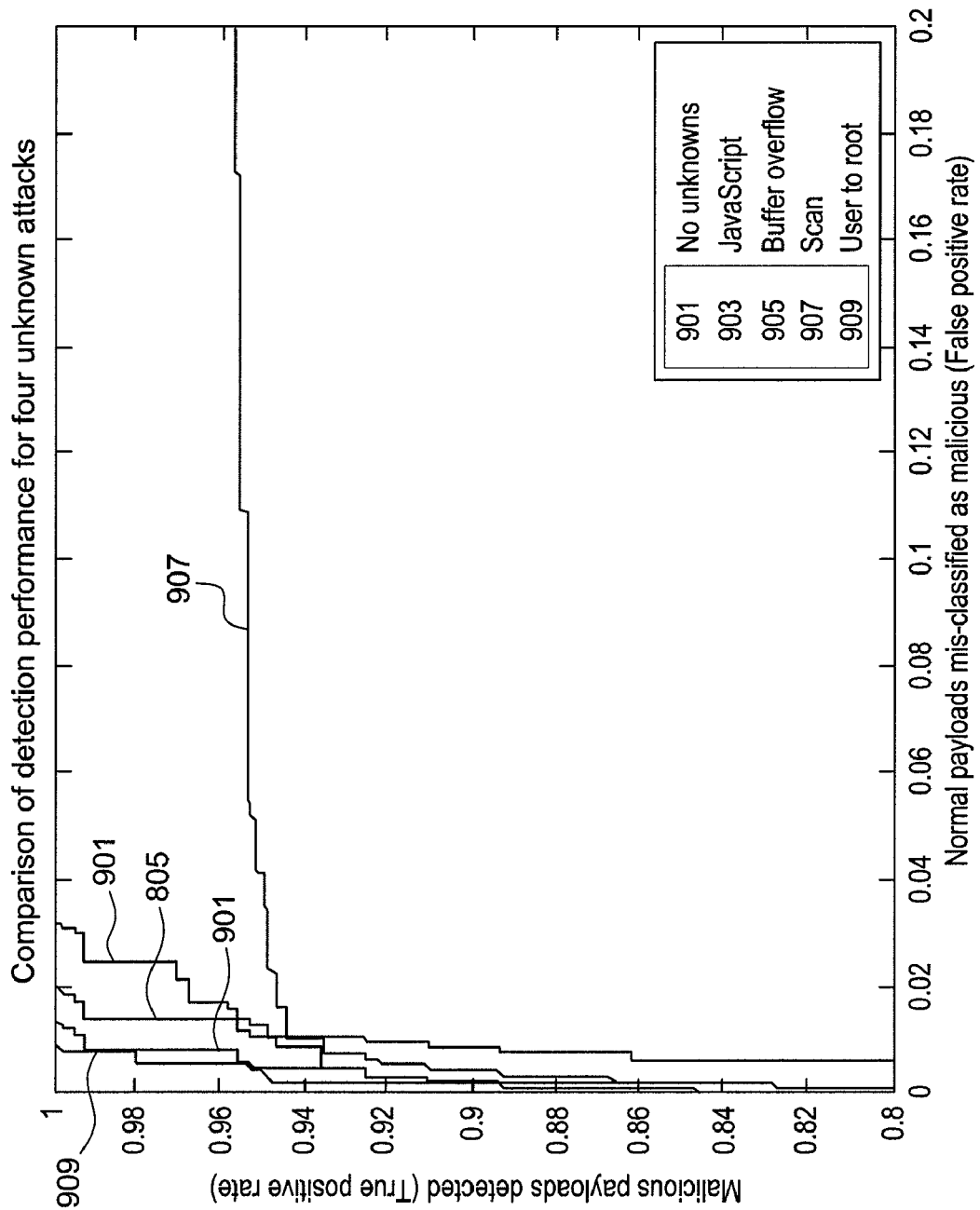
FIG. 9 is an example output display illustrating classification to one or more compression models according to various embodiments.

With respect to FIG. 9, there is shown a series of receiver operating characteristic (ROC) responses for the network intrusion detection system 100 for the five exemplary detection events of FIGS. 6 and 7. As shown in FIG. 9, the detection accuracy can decrease for zero-day attacks with respect to the known attacks. According to various embodiments, the threshold for detection or classification of an attack can be selected to conform to one of the ROC curves.

The false alarm rate in particular has been problematic for existing systems and methods. Table 2 below shows joint probability values of detection for the ROC responses of FIG. 9.

TABLE 2

| | Joint probability values for detection | | | | |
|---|---|---|---|---|---|
| Attack type | AUC | $T_+$ | $F_+$ | $T_-$ | $F_-$ |
| None | .9994 | .4997 | .00370 | .4963 | .00401 |
| User to root | .9988 | .4885 | .00374 | .4965 | .00146 |
| JavaScript | .9986 | .4959 | .01217 | .4879 | .00402 |
| Buf. overflow | .9930 | .4959 | .00688 | .4931 | .00401 |
| Scan | .9701 | .4733 | .00794 | .4920 | .0268 |

In at least one embodiment, the false alarm rate (for example, the probability that a target data sequence classified as an attack is actually a normal session) was found to be between 0.00370 and 0.01274. Furthermore, in at least one embodiment, the missed attack rate (for example, the probability that a target data sequence classified as normal is actually an attack) was found to be between 0.00146 and 0.0268. In addition, embodiments are effective to detect zero-day attacks, or previously unknown or un-modeled attack scenarios. In at least one embodiment, the zero-day attack total error rate was found to be 10.6%.

It will be appreciated that the modules, processes, systems, and sections described above can be implemented in hardware, software, or both. For example, the grammar inference engine 101 can be implemented, for example, using a processor configured to execute a sequence of programmed instructions. The processor can be for example, but not limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as C++. The instructions can also comprise code and data objects provided in accordance with, for example, the Visual Basic™ language, or another object-oriented programming language. The sequence of programmed instructions and data associated therewith can be stored in a computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor. Also, the processes, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hardwired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any process capable of implementing the functions or steps described herein can be used to implement embodiments of the method, system, or a computer program product (software program).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the mechanical and/or computer programming arts.

Moreover, embodiments of the disclosed method, system, and computer program product can be implemented in software executed on a programmed general purpose computer, a special purpose computer, a microprocessor, or the like.

In various embodiments, the grammar database 157 and the input database 158 can be implemented using any commercial database or database management system such as, for example, Oracle Database 11 g available from Oracle Corporation of Redwood Shores, Calif.

It is, therefore, apparent that there is provided, in accordance with the various embodiments disclosed herein, a network intrusion detection system and method that includes a grammar inference engine. A grammar-based Minimum Description Length (MDL) compression algorithm is used to determine an attack based on closeness of fit to one or more compression models. Attacks detected can include zero-day attacks.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the appended claims.

What is claimed is:

1. A network intrusion detection method, comprising:
receiving a sequence of input data;
separating the received sequence of input data into a plurality of input data portions;
associating each of the plurality of input data portions with one of a plurality of authorized users;
aggregating a number of the input data portions associated with one of the plurality of authorized users into a data set;
compressing the data set using a compression algorithm to produce a compressed data set;

forming at least one compression model, each said the at least one compression model comprising a plurality of the compressed data sets;
comparing each subsequent compressed data set associated with a subsequently received data set to each of the compressed data sets of the at least one compression model;
calculating a distance value for each comparison;
detecting an intrusion event, by a computer, based on one or more calculated distance values; and
outputting an intrusion detection decision, the intrusion detection decision comprising an alarm indication if an intrusion event is detected,
wherein the detecting includes:
  estimating a randomness deficiency for a received data set by applying the compression algorithm, each of the distance values being a distance metric associated with the estimated randomness deficiency;
  normalizing the estimated randomness deficiency based on a size of the received data set; and
  determining an intrusion event based on a difference between the normalized estimated randomness deficiency for the received data set and an expected compression contained in the at least one compression model.

2. The method of claim 1, wherein the at least one compression model comprises a healthy session model and an attack model, the attack model comprising compressed data sets associated with unauthorized or malicious activities.

3. The method of claim 1, further comprising:
classifying the subsequent compressed data set based on a level of model fit using the calculated distance.

4. The method of claim 1, wherein each of the compression models comprises a data dictionary and each of the compressed data sets comprises grammars.

5. The method of claim 1, wherein the compression algorithm is an algorithm that estimates Kolmogorov complexity.

6. The method of claim 5, wherein the compression algorithm is a grammar-based compression algorithm which forms compressive grammar based on Minimum Description Length (MDL) principles.

7. The method of claim 1, wherein the compression algorithm can be executed with a speed nlog(n), where n is the number of compressed data sets compared in the step of comparing.

8. The method of claim 1, wherein the receiving of a sequence of input data comprises monitoring data packets in an information data stream of an information system.

9. The method of claim 1, wherein the intrusion event is a zero day attack.

10. The method of claim 1, wherein the detecting of an intrusion event comprises:
comparing each calculated distance value to a threshold value, the threshold value being selected based on a receiver operating characteristic (ROC).

11. A machine-implemented grammar inference engine for intrusion detection, comprising:
a pre-processor, implemented by a computer processor, that receives an input data stream and is configured to output filtering data;
a grammar generator, implemented by the computer processor, coupled to the pre-processor and configured to generate grammars by applying a compression algorithm to the filtered data;
a grammar applicator, implemented by the computer processor, that compares the grammars generated or identified by the grammar generator to the input data stream, using the compression algorithm, and that calculates a distance value for each of a plurality of portions of the input data stream from a plurality of class models; and
a classifier, implemented by the computer processor, coupled to the grammar applicator and to a post-processor, wherein the classifier receives the distance values from the grammar applicator and decision criteria from the post-processor,
the classifier is configured to calculate a likelihood of fit between each portion of the input data stream and the class models,
the post-processor assigns each portion of the input data stream to one of the class models and outputs an indication of the assigned class models, and the intrusion is detected by:
estimating a randomness deficiency for the input data stream by applying the compression algorithm, each distance value being a distance metric associated with the estimated randomness deficiency;
normalizing the estimated randomness deficiency based on a size of the input data stream; and
determining an intrusion event based on a difference between the normalized estimated randomness deficiency for the input data stream and an expected compression contained in the at least one compression model.

12. The grammar inference engine of claim 11, further comprising:
a grammar database comprising a health signature database and a fault signature database; and
an input database coupled to an output of the pre-processor, wherein the grammar applicator is configured to receive filtered data processed by the pre-processor from the input database.

13. The grammar inference engine of claim 11, wherein the input data stream is received from an information system.

14. The grammar inference engine of claim 13, wherein the information system is a communication network.

15. The grammar inference engine of claim 11, wherein the class models comprise a normal model and an attack model.

16. The grammar inference engine of claim 11, wherein the compression algorithm is an algorithm that estimates Kolmogorov complexity and randomness deficiency.

17. The grammar inference engine of claim 16, wherein the compression algorithm is a grammar-based compression algorithm which forms compressive grammar based on Minimum Description Length (MDL) principles.

18. The grammar inference engine of claim 11, wherein the pre-processor is further configured to apply a sliding window protocol to segment portions of the input data stream.

19. The grammar inference engine of claim 18, wherein the compression algorithm is a grammar-based compression algorithm that estimates Kolmogorov complexity and which forms compressive grammar based on Minimum Description Length (MDL) principles.

20. The grammar inference engine of claim 11, wherein the grammar applicator and said grammar generator executes said compression algorithm with a speed nlog(n), and
n is the number of compressed data sets compared.

21. The grammar inference engine of claim 11, wherein the intrusion event is a zero day attack.

22. The grammar inference engine of claim 11, wherein the classifier compares each of the calculated distance value to a threshold value to determine the likelihood of fit, the threshold value being selected based on a receiver operating charteristic (ROC).

23. The grammar inference engine of claim 11, wherein each distance value is a distance metric associated with the estimated randomness deficiency.

24. A non-transitory computer-readable medium upon which is embodied a sequence of programmable instructions which, when executed by a processor, cause the processor to perform a network intrusion detection method comprising:
receiving a sequence of input data;
separating the received input data sequence into a plurality of input data portions;
associating each input data portion with one of a plurality of authorized users;
aggregating a number of the input data portions associated with one of the plurality of authorized users into a data set;
compressing the data set using a compression algorithm to produce a compressed data set;
forming at least one compression model, each compression model comprising a plurality of the compressed data sets;
comparing each subsequent compressed data set associated with a subsequently received data set to each compressed data set of the at least one compression model;
calculating a distance value for each comparison;
detecting an intrusion event based on one or more of the calculated distance values; and
outputting an intrusion detection decision, the intrusion detection decision comprising an alarm indication if an intrusion event is detected;
wherein the step of detecting includes:
estimating a randomness deficiency for a received data set by applying the compression algorithm, each distance value being a distance metric associated with the estimated randomness deficiency;
normalizing the estimated randomness deficiency based on a size of the received data set; and
determining an intrusion event based on a difference between the normalized estimated randomness deficiency for the received data set and an expected compression contained in the at least one compression model,
wherein the compression algorithm is a grammar-based compression algorithm that estimates Kolmogorov complexity and which forms compressive grammar based on Minimum Description Length (MDL) principles.

25. The non-transitory computer-readable medium of claim 24, wherein the compression algorithm can be executed with a speed nlog(n), where n is the number of compressed data sets compared in the step of comparing.

26. The non-transitory computer-readable medium of claim 24, wherein the intrusion event is a zero day attack.

* * * * *